May 17, 1966  K. V. FRANKLIN  3,251,922
RADAR TRAINING APPARATUS
Filed May 20, 1963  4 Sheets-Sheet 2

INVENTOR
Kenneth V. Franklin
BY
Stevens, Davis, Miller & Mosher
ATTORNEYS

May 17, 1966 K. V. FRANKLIN 3,251,922
RADAR TRAINING APPARATUS
Filed May 20, 1963 4 Sheets-Sheet 3

INVENTOR
Kenneth V. Franklin
BY
Stevens, Davis, Miller & Mosher
ATTORNEYS 3,251,922
RADAR TRAINING APPARATUS
Kenneth Vincent Franklin, Crawley, Sussex, England, assignor to Communications Patents Limited
Filed May 20, 1963, Ser. No. 281,519
Claims priority, application Great Britain, June 27, 1962, 24,608/62
9 Claims. (Cl. 35—10.4)

This invention relates to radar or tactical training apparatus.

It is known to provide a plan view of the assumed positions of ships, aircraft, land features and other objects on the display screen of a cathode ray tube, either for the purpose of training radar operators or for use in tactical exercises. In providing such displays, it is customary to include range limiting means so that the maximum range at which it is possible to detect each of the movable craft may be simulated.

In one known method of generating the positions of the movable craft, D.C. computing means are used, which include means for generating in sequence, the co-ordinates of each of the craft to fixed rectangular axes $X_r$ and $Y_r$. Range limiting effects are provided using a subsidiary A.C. computing system in which signals are generated corresponding to $X_r \cos \omega t$ and $Y_r$ are each of the craft. The quadrature signals are summed to obtain ground range signals. These ground range signals are fed to circuits which control the display on the cathode ray tube so that only those craft within detection range are visible on the screen of the tube.

The separate A.C. computing system is elaborate and is costly.

It is an object of the present invention to provide radar training apparatus in which position information and range limiting information, related to the simulated aircraft, are both derived from co-ordinate signals generated in a direct current computing system.

According to the present invention, radar simulating apparatus comprises means for generating, in sequence, co-ordinate signals corresponding to the co-ordinates from a datum point, of each of a plurality of simulated observed craft, means for generating, in sequence, range control signals for each of the observed craft, each range control signal having a maximum value corresponding to a simulated maximum range of observation of each of the observed craft, said co-ordinate signals and said range control signals being representative of true range as defined, for rectangular co-ordinates, as the square-root of the sum of the squares of the co-ordinates, the signal amplitude comparison means for comparing the said co-ordinate signals, and the said range control signals of each observed craft, and gating means controlled by the said comparison means, so that only those observed craft with simulated positions within the corresponding simulated observation range are displayed by display means of the apparatus.

In order that the invention may be readily carried into effect, one embodiment thereof will now be described in detail, by way of example, with reference to the accompanying drawings, in which:

FIG. 3 is a diagram of a range limiting system according to the invention, for use with the apparatus of FIG. 1 and FIG. 2.

Figure 1:
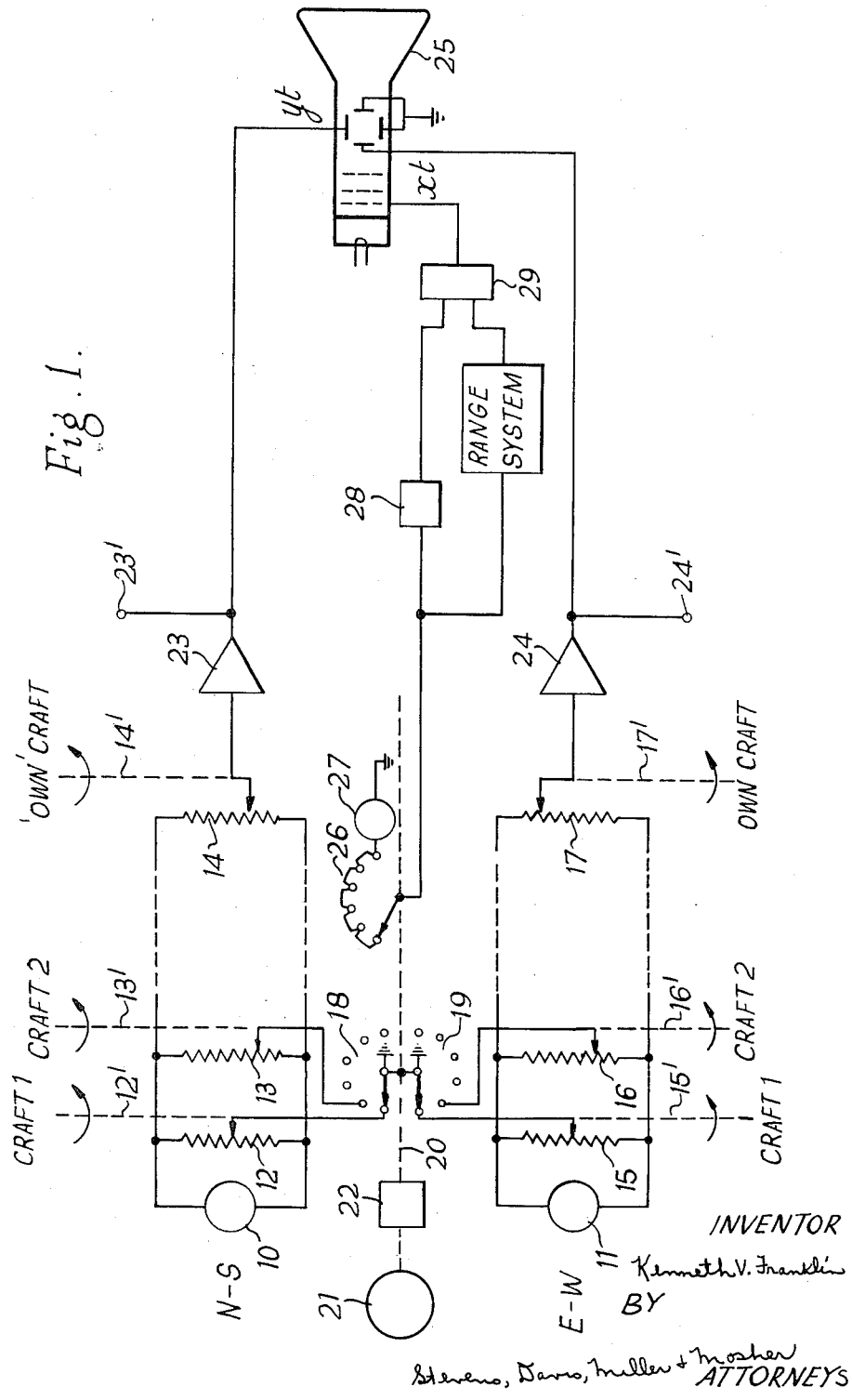
FIG. 1 is a diagram of a system for generating the co-ordinates of craft displayed by the cathode ray tube of a radar simulating apparatus.

In FIG. 1, a D.C. co-ordinate computing system for generating the co-ordinates of two radar observed craft and a radar equipped "own" craft is schematically illustrated. Direct current sources 10 and 11 provide floating supplies to helipotentiometers 12, 13, 14 and 15, 16, 17 respectively, the helipotentiometers having shafts 12', 13', 14' and 15', 16', 17' respectively. The shafts of pairs of helipotentiometers associated with each craft are coupled to separate computing systems, not shown, which function to position the shaft pairs 12' and 15', 13' and 16', and 14' and 17', so that the angular setting of the shafts at any instant of time, represents respectively the North-South and the East-West displacements, from a fixed point of reference, of the craft concerned.

The North-South helipotentionmeters 12 and 13 have their wipers connected to the contacts of a multi-contact switch 18 and the East-West helipotentiometers 15 and 16 have their wipers connected to the contacts of a multi-contact switch 19. Switches 18 and 19 are mechanically coupled to the shaft 20, which is rotated by a constant speed motor 21, via a gearbox 22. The switches 18 and 19 earth the wipers of the co-ordinate helipotentiometers cyclically. The output signals from the wipers of helipotentiometers 14 and 17, measured relative to ground potential consist of a cyclical sequence of D.C. voltage level pairs, each pair of which are analogues of the relative cartesian co-ordinates of each observed craft in sequence relative to the radar equipped "own" craft. The speed of rotation of the shaft is such that the voltage levels change every 60 milliseconds.

The signals from the wipers of helipotentiometers 14 and 17 are fed to the inputs of buffer amplifiers 23 and 24, respectively, and the outputs of these amplifiers are applied to deflection electrodes $yt$ and $xt$ respectively of a cathode ray tube 25. A multi-contact switch 26, also coupled to the shaft 20, provides from a D.C. source 27, by break-before-make contact operation, an input of pulse form to a delay monostable unit 28.

The function of the unit 28 is to provide a "bright-up" pulse, via an "and" gate 29, to the grid of the tube 25, so that a display of the position signals is produced on the screen of the tube only after the sequencing circuits have settled down. The "and" gate 29 is part of a system used for range limiting and is described later in the specification.

The cathode ray tube 25 has a screen with a long persistence phosphor, so that a display is maintained continuously on the face of the tube, the craft trace moving slowly as the helipotentiometers 12 to 17 are rotated.

In actual radar systems, a movable craft is visible up to a certain maximum range which is determined by the power and aerial efficiency of the transmitting station and by the size and reflectivity of the observed craft. In the apparatus of the present invention, the maximum range $R_m$ is determined by the product of two factors representing these conditions, an "own" craft factor ($F_o$) and an observed craft factor ($F_c$). These factors are set in by manual controls.

Figure 2:
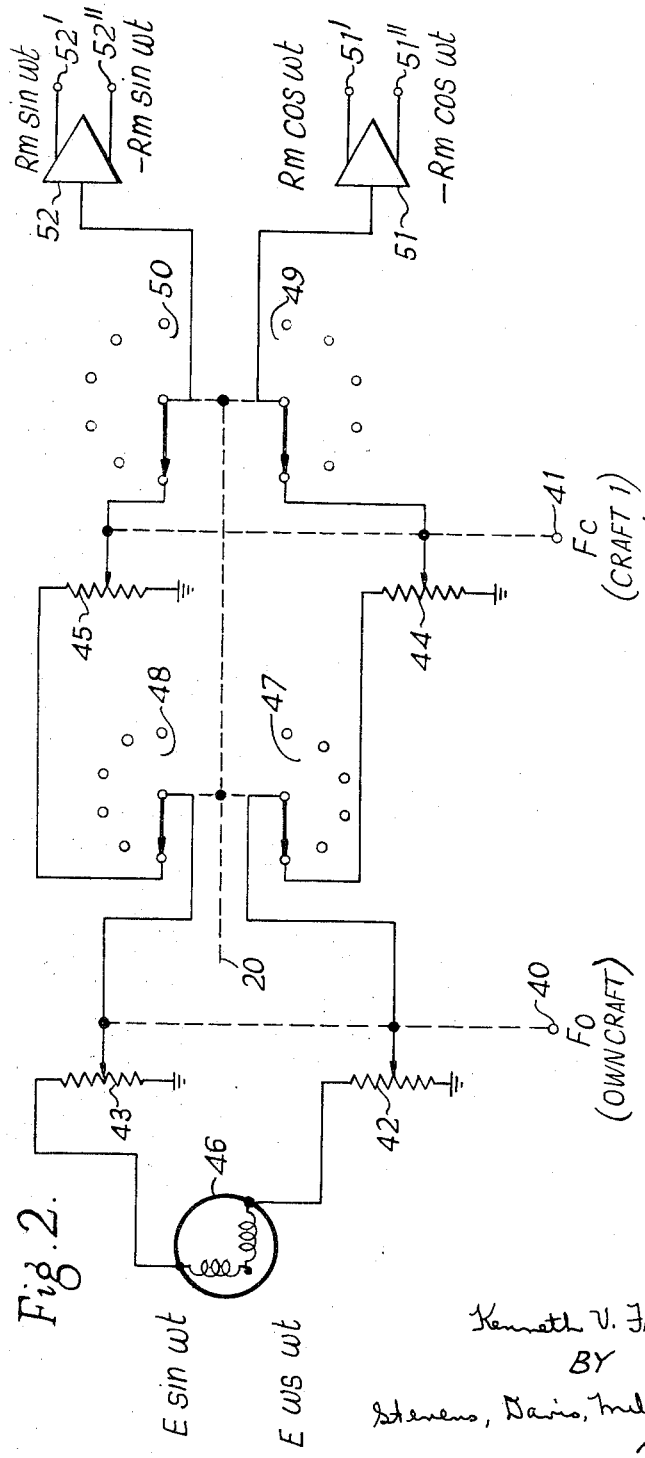
FIG. 2 is a diagram of a system for controlling the range at which the displayed signals fade.

Referring to FIG. 2, manual control 40 for setting in the factor $F_o$ relating to the "own" craft, and manual control 41 for setting in the factor $F_c$ relating to observed craft 1, are mechanically coupled to pairs of potentiometers 42, 43 and 44, 45 respectively. A two phase quadrature source of supply of alternating current 46, having a frequency of 50 c.p.s. is fed to the windings of potentiometers 42 and 43. The wipers of potentiometers 42 and 43 are connected to the wipers of multi-contact switches 47 and 48 respectively. The wipers of these switches are mechanically coupled to the shaft 20 of FIG. 1.

The windings of potentiometers 44 and 45 are connected to contacts of switches 47 and 48 respectively and the wipers to contacts of multi-contact switches 49 and 50 respectively. The wipers of switches 49 and 50 are connected to the inputs of amplifiers 51 and 52 respectively and are mechanically coupled to the shaft 20 of FIG. 1. Hence the A.C. voltage fed to the input of amplifier 51 is derived from the $E \sin \omega t$ phase of the two phase supply and the voltage fed to the input of amplifier 52 is derived from the $E \cos \omega t$ phase of the two phase supply. The amplifiers 51 and 52 are of conventional design suitable for operation at frequencies about fifty cycles per second, each providing a push-pull voltage output, for example, from a center-tapped winding of an output transformer, the output of amplifier 51 being fed to terminals 51' and 51" and the output of amplifier 52 being fed to terminals 52' and 52".

In FIG. 2, the windings and the wipers of potentiometers 44 and 45 are connected to contact positions corresponding to the contact positions on switches 18 and 19, FIG. 1, used to provide the coordinate voltages of craft 1.

The manual control used to set in the factor $F_c$ for observed craft 2 and the associated potentiometers have been omitted from the diagram for the sake of clarity.

The signals fed to amplifiers 51 and 52 thus consist of a series of A.C. voltages whose peak values correspond to the desired maximum ranges beyond which the represented craft cannot be detected. The voltages fed to the amplifiers are in phase quadrature and the signal voltages produced at output terminals 51' and 51" of amplifier 51 and output terminals 52' and 52" of amplifier 52 are:

Terminal 51' — — — — — — — $R_m \cos \omega t$
Terminal 51" — — — — — — — $-R_m \cos \omega t$ for each of the
Terminal 52' — — — — — — — $R_m \sin \omega t$ observed craft.
Terminal 52" — — — — — — — $-R_m \sin \omega t$ where $R_m$ = fixed reference voltage range analogue times the product of factor $F_o$ and factor $F_c$, for each craft
$\omega = 2\pi f$ and $f = 50$ c.p.s.

Referring to FIG. 3, the D.C. co-ordinate signals from output terminal 23' of amplifier 23, FIG. 1, are fed to comparators 60 and 61, via summing resistors 62 and 63' respectively, together with the range limiting signals $-R_m \cos \omega t$ and $R_m \cos \omega t$, via summing resistors 62' and 63' respectively.

The D.C. co-ordinate signals from output terminal 24' of amplifier 24, FIG. 1, are fed to comparators 64 and 65 via summing resistors 66 and 67 respectively, together with the range limiting signals $-R_m \sin \omega t$ and $R_m \sin \omega t$ via summing resistors 66' and 67' respectively.

The comparators 60, 61, and 65 are high gain direct coupled amplifiers. Each amplifier has two chains of three triodes, connected in cascade to provide two stages of voltage amplification, and a cathode follower stage. Twin triodes are used in the first and second stages and a pair of triodes in the cathode follower stage. One grid of the twin triodes of the first stage is connected to the two summing resistors providing co-ordinate and range limiting signals to the comparator, the other grid is connected to chassis, and the cathodes are connected to a common cathode resistor. Hence, the potentials of the anodes of the input twin triodes change in opposite senses when a signal is applied to the input grid.

The voltage gains provided by the two triodes of the first stage are such that first and second triodes of the second stage are each driven to saturation and to cut-off by a voltage of positive or negative polarity applied to the grid of the input triode, the magnitude of this voltage being small compared with the amplitude of a typical range signal.

If the co-ordinate signal is zero, the triodes of the second stage are each driven to saturation and to cut-off during each cycle of the A.C. range signal and a rectangular waveform is produced at each of the anodes of the second stage, having the same periodicity as that of the range signal.

Let it be assumed that a co-ordinate voltage, of positive polarity and of a value such that the second triode of the second stage is held at saturation, is applied to the co-ordinate signal input. During each positive half-cycle of the range signal, the second triode will be driven beyond saturation and its anode voltage will remain substantially constant. During each negative half-cycle of the range signal, the second triode will be driven from saturation to cut-off and beyond cut-off and its anode voltage will rise. Hence, positive going pulses of voltage will be produced at the anode of the second triode, the width of each pulse being substantially half the period of the A.C. range signal.

Now let it be assumed that a co-ordinate signal voltage, of negative polarity and of a value such that the second triode of the second stage is held at cut-off, is applied to the co-ordinate signal input. During each negative half-cycle of the range signal, the second triode will be driven beyond cut-off and its anode voltage will remain substantially constant. During each positive half-cycle of the range signal, the second triode will be driven from cut-off to saturation and beyond saturation, and its anode voltage will fall. Hence negative going pulses of voltage will be produced at the anode of the second triode, the width of each pulse being substantially half the period of the A.C. range signal. For positive polarity co-ordinate signals increasing in magnitude, the portion of the negative half-cycle of the range signal during which the second triode is driven from saturation to cut-off is reduced and the width of the positive going pulses at the anode of the second triode becomes less and less until the magnitude of the co-ordinate signal exceeds the amplitude of the range signal, when the second triode is always driven beyond saturation and pulses are no longer generated. For negative polarity co-ordinate signals increasing in magnitude, the width of the negative going pulses at the anode of the second triode becomes less and less until the magnitude of the co-ordinate signal exceeds the amplitude of the range signal, when the second triode is always driven beyond cut-off and pulses are no longer produced.

Pulses corresponding to those provided at the anode of the second triode, of opposite phase, are similarly produced at the anode of the first triode. Thus signals of rectangular waveform are applied to the grids of the cathode followers, if the amplitude of the A.C. range signal exceeds the value of the D.C. co-ordinate signal. Corresponding output signals, having a 180° phase relationship, are provided across cathode resistors of the two cathode followers.

In comparators 60 and 64 that output is used which provides signals of positive polarity as the combined input voltage to each comparator passes through zero and becomes positive, with Y or X co-ordinate signals of negative polarity fed to terminals 23' and 24' respectively. In comparators 61 and 65, that output is used which provides output signals of positive polarity as the combined input voltage to each comparator passes through zero and becomes negative, with Y or X co-ordinate signals of positive polarity fed to terminals 23' and 24' respectively.

Output signals of negative polarity are generated by comparators 60 and 64 with co-ordinate signals of positive polarity and by comparators 61 and 65 with co-ordinate signals of negative polarity.

The output signal from each comparator has the form of a series of pulses, each pulse having a width corresponding to the period of time during which the instantaneous amplitude of the alternating voltage applied to one input terminal exceeds the D.C. co-ordinate voltage applied to the other. Thus, the pulse width is a maximum when the D.C. co-ordinate voltage is zero and corresponds to half the period of the A.C. range input voltage. The pulse width is zero when the D.C. co-ordinate input voltage is equal to the maximum value of the A.C. range input voltage.

Pulses of positive and negative polarity are produced if the co-ordinate voltage is zero or is very small and is insufficient to produce saturation and cut-off conditions in the comparator. This is of no consequence since unwanted pulses, of negative polarity, are rejected in a manner to be described.

The pulses from comparators 60 and 61 are fed to an "or" gate 68, comprising diodes 69, 69', resistors 70, 71 and triode valve 72. The diodes are connected so that only pulses of positive polarity are passed from comparator 60 or from comparator 61, via the valve 72, to one input of an "and" gate 78. The valve 72 is connected to function as a cathode follower.

The pulses from camparators 64 and 65 are fed to an "or"" gate 73, comprising diodes 74, 74', resistors 75, 76 and triode valve 77. The diodes are connected so that only pulses of positive polarity are passed from comparator 64 or comparator 65 via the valve 77, to the other input of the "and" gate 78. The valve 77 is connected to function as a cathode follower.

The "and" gate 78 comprises input diodes 79, 80, resistors 81, 82, and triode valve 83. The diodes and resistor 81 are connected so that a signal is fed to the control grid of the valve 83 only when input signals are present at both inputs of the gate 78 simultaneously, that is to say, over the period of time during which the pulses from the gates 68 and 73 overlap.

The valve 83, connected to function as a cathode follower, provides an output signal corresponding to the pulses applied to the control grid. This output signal is fed to a bistable unit 84. The pulses are fed to the bistable unit via a differentiating network 85, comprising capacitors 86, 86', resistor 87 and diode 87'. In the network 85, positive differentiated pulses are produced for triggering the bistable unit, unwanted negative differentiated pulses being suppressed by diode 87'.

It is shown in an appendix to this specification that pulses are applied to the bistable unit 84 only if $X_r^2+Y_r^2$ is less than $R_m^2$, where $R_m$ is the maximum detection range of the craft.

In the unit 84, triode valves 88, 88', resistors 89, 89', 90, 90', 91, 91' and 92 and capacitors 93, 93' are connected to function as a bistable device. The differentiated pulses from network 85 are fed to the control grid of triode 88 via the anode of triode 88'.

A resetting pulse, derived from the switch 26, FIG. 1, is fed to the bistable unit via a differentiating network 94, comprising capacitors 95, 95', resistor 96 and diode 96'. The pulse waveform produced by the switch 26, has zero amplitude during a break period. Each pulse is negative going at the onset of a make period and remains negative during the make period. This pulse signal is differentiated by the network 94, the unwanted negative differentiated pulse produced at the onset of each make period being suppressed by the diode 96'. The wanted positive differentiated resetting pulse produced at the end of each break period, is applied to the anode of the triode 88, via the capacitor 95'. Hence, a reset pulse is generated at the end of each break period, that is to say immediately before the next co-ordinate switching step. At the instant the differentiated resetting pulse is applied to the control grid of triode 88', via the anode of triode 88, the valve currents are such that valve 88 is cut off and valve 88' is fully conductive.

The anode of the valve 88' is directly coupled via a neon tube 99 to a resistor 97 and to the control grid of a triode 98, connected with resistor 100 to function as a cathode follower.

If no pulses are fed to the control grid of triode 88, it remains cut off. Under these conditions, the potential of the cathode of valve 98 is relatively low.

The output of the cathode follower 98 is fed to an "and" gate 29, together with output pulses from the delay monostable unit 28, FIG. 1. The "and" gate 29 comprises input diodes 101, 101', resistors 102, 103, 104 and triode valve 105. The diodes 101, 101' and resistors 102, 103 are connected so that a signal is fed to the control grid of the valve 105 only when signals are present at both inputs simultaneously.

The valve 105, connected to function as a cathode follower, provides an output "bright-up" signal to the cathode ray tube 25, FIG. 1.

The delay monostable 28 is triggered by the negative going edge of each pulse of the waveform produced by the switch 26 and introduces the required settling delay after the onset of the input pulse. The output of the delay monostable 28 is negative during its period of operation and is positive at the end of this period. During the period the output is negative, the "and" gate 29 is maintained in the "off" state, via the diode 101'. At the end of the delay period, as a result of the positive voltage at the output of the delay monostable 28, the gate 29 is no longer inhibited and any signal from the cathode follower 98 of the bistable unit 84 is passed to the grid of the valve 105, by way of the diode 101, to produce the "bright-up" pulse from the cathode resistor 104 for feeding to the grid of the C.R.T.

The sequence of events is that the bistable unit 84 having been reset at the end of the last target step may be triggered by the next target range limiting signal if the target is within pre-determined range. Where the target is within range, pulses at the repetition frequency of fifty per second, are developed in the gate 78 and are applied via the network 85 to the bistable unit 84. The bistable circuit switches to the "on" state, defined as valve 88 conducting and valve 88' nonconducting, and the positive signal at the anode of the valve 88' is fed via neon tube 99 to the cathode follower 98, so that a positive signal is fed from the cathode of valve 98 to the "and" gate 29 via the diode 101. This positive signal prepares gate 29 to receive the brightening pulse from the delay monostable 28. If the target is out of range, the gate 29 remains inhibited by the negative level of the voltage from the anode of the valve 88', fed via neon tube 99 and cathode follower 98 to the diode 101.

The time interval between reset pulses is such that two range pulses may occur between reset pulses. This is of no consequence, since a succession of pulses fed to the "on" valve of the bistable unit will not cause a change of state in the unit.

*Appendix*

Figure 4:
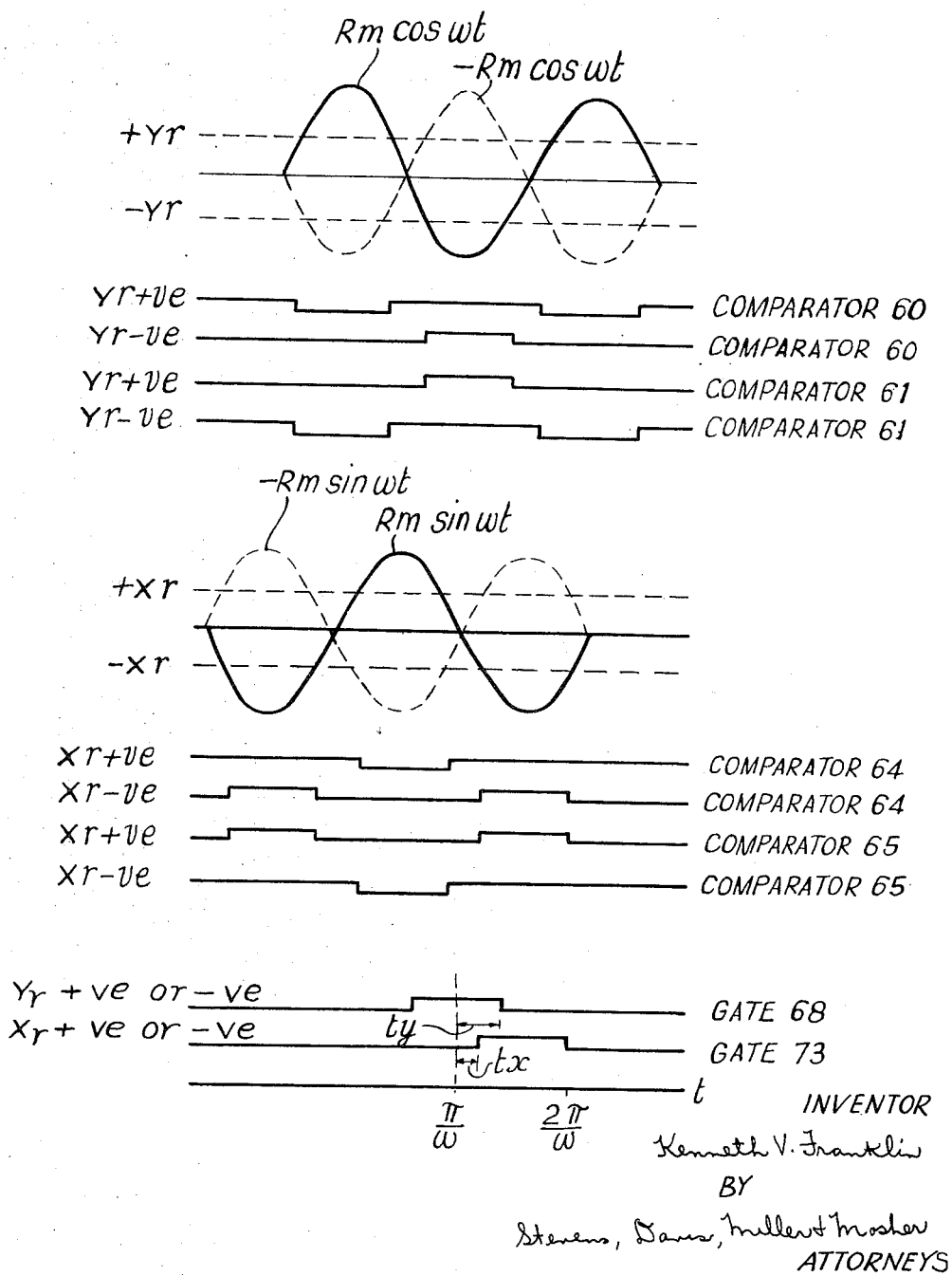
FIG. 4 illustrates various waveforms which occur in parts of the apparatus.

The waveforms referred to in this appendix are shown in FIG. 4.

In comparators 60 and 61 the $Y_r$ co-ordinate signals are compared $-R_m \cos \omega t$ and $+R_m \cos \omega t$ and in the comparators 64 and 65 the $X_r$ co-ordinate signals are compared with $-R_m \sin \omega t$ and $+R_m \sin \omega t$, where $R_m$ is the maximum detection range.

If the peak value of $R_m \cos \omega t$ or $+R_m \cos \omega t$ is greater than $Y_r$, positive-going pulses are provided by comparator 60 if $Y_r$ is of negative polarity, and by comparator 61 if $Y_r$ is of positive polarity.

Similarly if the peak value of $-R_m \sin \omega t$ or $+R_m \sin \omega t$ is greater than $X_r$, positive-going pulses are produced by comparator 64 if $X_r$ is of negative polarity, and by comparator 65 if $X_r$ is of positive polarity.

The output pulses of the waveforms produced at the outputs of gates 68 and 73 are positive-going pulses irrespective of the polarity of the $X_r$ and $Y_r$ co-ordinate signals.

Let the reference time for the waveforms from gates 68 and 73 be transferred to $t=\pi/\omega$ and let $t_x$ be the time of the leading edge of an eastings pulse and $t_y$ be the time of the lagging edge of a northings pulse.

If $t_x < t_y$, the two positive pulses fed to the "and" gate 78 are partly coincident and the gate allows the bistable unit 84 to be triggered.

If $t_x > t_y$, the two positive pulses fed to the "and" gate 78 are completely separate and the bistable unit is not triggered.

Now $t_x$ is defined by:

$$R_m \sin \omega t_x = |X_r|$$

i.e.

$$t_x = \frac{1}{\omega} \sin^{-1} \frac{|X_r|}{R_m}$$

similarly $$t_y = \frac{1}{\omega} \cos^{-1} \frac{|Y_r|}{R_m}$$

if $t_x < t_y$ $$\frac{1}{\omega} \sin^{-1} \frac{|X_r|}{R_m} < \frac{1}{\omega} \cos^{-1} \frac{|Y_r|}{R_m}$$

i.e.

$$\frac{|X_r|}{R_m} < \sin \left[ \cos^{-1} \frac{|Y_r|}{R_m} \right[$$

$$\frac{X_r}{R_m} < \sqrt{\frac{R_m^2 - Y_r^2}{R_m}}$$

or $$X_r^2 + Y_r^2 < R_m^2$$

Thus, a response is produced by the cathode ray tube only if the observed craft is within the range determined by the system constants R, $F_o$ and $F_c$.

What we claim is:

1. Radar simulating apparatus comprising means for generating, in sequence, co-ordinate signals corresponding to the co-ordinates from a datum point of each of a plurality of simulated observed craft, means for generating, in sequence, range control signals for each of the observed craft, each range control signal having a maximum value corresponding to a simulated maximum range of observation of each of the observed craft, said co-ordinate signals and said range control signals being representative of true range as defined, for rectangular co-ordinates, as the square-foot of the sum of the squares of the co-ordinates, signal amplitude comparison means for comparing the said co-ordinate signals, and the said range control signals of each observed craft, gating means controlled by the said comparison means, so that only those observed craft with simulated positions within the corresponding simulated observation range are displayed by display means of the apparatus means for generating first co-ordinate signals corresponding to the coordinates from a datum point of an "own" craft and a plurality of simulated observed craft and means for deriving second co-ordinate signals corresponding to the algebraic difference between the first co-ordinate signals of the "own" craft and each observed craft in sequence, the range control signals being derived from said second co-ordinate signals, a North-South co-ordinate signal generator comprising a potentiometer for the "own" craft and for each observed craft connected in parallel across a supply source, the shaft of each potentiometer being continuously adjusted according to the N-S co-ordinate of the corresponding craft, a connection from the output of the "own" craft potentiometer to a first output terminal, and switch means for connecting, in sequence, the outputs of the observed craft potentiometers to a second output terminal, the second co-ordinate N-S signals being generated between the first and second output terminals .

2. Radar simulating apparatus comprising means for generating, in sequence, first co-ordinate signals corresponding to the co-ordinates from a datum point of an "own" craft and a plurality of simulated observed craft and means for deriving second co-ordinate signals corresponding to the algebraic difference between the first co-ordinate signals of the "own" craft and each observed craft in sequence, means for deriving, in sequence, range control signals for each of the observed craft, each range control signal having a maximum value corresponding to a simulated maximum range of observation of each of the observed craft, said second co-ordinate signals and said range control signals being representative of true range as defined, for rectangular co-ordinates, as the square-root of the sum of the squares of the co-ordinates, signal amplitude comparison means for comparing the said second co-ordinate signals, and the said range control signals of each observed craft, gating means controlled by the said comparison means, so that only those observed craft with simulated positions within the corresponding simulated observation range are displayed by display means of the apparatus; the coordinates signal generator for at least one direction comprising a potentiometer for the "own" craft and for each observed craft connected in parallel across a supply source, the shaft of each potentiometer being continuously adjusted according to the coordinate of the corresponding craft, in said one direction, a connection from the output of the "own" craft potentiometer to a first output terminal, and switch means for connecting, in sequence, the outputs of the observed craft potentiometers to a second output terminal, the second co-ordinate signals in said one direction being generated between the first and second output terminals.

3. Radar simulating apparatus as claimed in claim 1, having a North-South co-ordinate signal generator comprising a potentiometer for the "own" craft and for each observed craft connected in parallel across a supply source, the shaft of each potentiometer being continuously adjusted according to the N-S co-ordinate of the corresponding craft, a connection from the output of the "own" craft potentiometer to a first output terminal, and switch means for connecting, in sequence, the outputs of the observed craft potentiometers to a second output terminal, the second co-ordinate N-S signals being generated between the first and second output terminals.

4. Radar simulating apparatus as claimed in claim 1, having an East-West co-ordinate signal generator comprising a potentiometer for the "own" craft and for each observed craft connected in parallel across a supply source, the shaft of each potentiometer being continuously adjusted according to the E-W co-ordinate of the corresponding craft, a connection from the output of the "own" craft potentiometer to a third output terminal and switch means for connecting, in sequence, the outputs of the observed craft potentiometers to a fourth output terminal, the second co-ordinator E-W signals being generated between the third and fourth output terminals.

5. Radar simulating apparatus as claimed in claim 4, comprising range control means having setting means for setting in a predetermined range factor relating to "own" craft and setting means for setting in a predetermined range factor relating to each observed craft and switch means for deriving, in sequence, the product of "own" craft range factor and each observed craft range factor, said product defining the observation range of the corresponding observed craft.

6. Radar simulating apparatus as claimed in claim 5, comprising a two phase (quadrature) generator supplying a sinusoidal output to a first potentiometer of a pair and a cosinusoidal output to the second potentiometer of the pair, the pair of potentiometers being preset according to "own" craft range factor, a further pair of potentiometers for each observed craft preset according to the range factor of the corresponding observed craft, switching means for supplying the outputs of the "own" craft pair of potentiometers to the input of each observed craft pair of potentiometers, in sequence, the outputs of the pair of observed craft potentiometers so supplied being fed to a pair of amplifiers, each amplifier providing two outputs, said outputs being of equal magnitude but of opposite sign to each other.

7. Radar simulating apparatus as claimed in claim 6, in which the four outputs of said amplifiers represent the values:

$$R_m \sin \omega t$$
$$-R_m \sin \omega t$$
$$R_m \cos \omega t$$
$$-R_m \cos \omega t$$

wherein $R_m$ is the range factor product relative to each observed craft and $\sin \omega t$ and $\cos \omega t$ define said sinusoidal and cosinusoidal generator outputs, respectively.

8. Radar simulating apparatus as claimed in claim 7, having comparators for comparing said second co-ordinate signals with the amplifier outputs of both sign and means for deriving from the outputs thereof a control signal when the corresponding observed craft is within the observation range.

9. Radar simulating apparatus as claimed in claim 8, wherein said second N-S and E-W co-ordinate signals are D.C. signals and wherein the output signals of said comparators are pulses of duration corresponding to the difference between the D.C. and A.C. inputs thereto, the said outputs being supplied to a pair of "or" gates and to an "and" gate, in the stated sequence, to derive an output signal solely if the corresponding observed craft is within the observation range.

References Cited by the Examiner

UNITED STATES PATENTS

| | | | |
|---|---|---|---|
| 2,604,705 | 7/1952 | Hesserich et al. | 35—10.4 |
| 2,951,297 | 9/1960 | Colker | 35—10.4 |
| 3,068,466 | 12/1962 | Lindley | 343—5 |

CHESTER L. JUSTUS, *Primary Examiner.*

MAYNARD R. WILBUR, LEWIS H. MYERS,
*Examiners.*